(12) United States Patent
Hua

(10) Patent No.: US 9,989,421 B2
(45) Date of Patent: Jun. 5, 2018

(54) SURFACE TEMPERATURE SENSOR

(71) Applicant: Shenzhen Minjie Electronic Technology Co., Ltd., Shenzhen (CN)

(72) Inventor: Guoliang Hua, Shenzhen (CN)

(73) Assignee: Shenzhen Minjie Electronic Technology Co., LTD., Shenzhen (CN)

( * ) Notice: Subject to any disclaimer, the term of this patent is extended or adjusted under 35 U.S.C. 154(b) by 495 days.

(21) Appl. No.: 14/534,196

(22) Filed: Nov. 6, 2014

(65) Prior Publication Data
US 2015/0063423 A1 Mar. 5, 2015

Related U.S. Application Data

(63) Continuation-in-part of application No. PCT/CN2013/074367, filed on Apr. 18, 2013.

(30) Foreign Application Priority Data

| | | |
|---|---|---|
| May 14, 2012 | (CN) | 2012 1 0148400 |
| Jul. 9, 2012 | (CN) | 2012 1 0235742 |
| Sep. 14, 2012 | (CN) | 2012 1 0340007 |

(51) Int. Cl.
G01K 7/22 (2006.01)
G01K 1/08 (2006.01)

(52) U.S. Cl.
CPC .............. G01K 7/223 (2013.01); G01K 1/08 (2013.01); G01K 7/22 (2013.01)

(58) Field of Classification Search
CPC ................................................. G01K 7/223
See application file for complete search history.

(56) References Cited

U.S. PATENT DOCUMENTS

| | | | | |
|---|---|---|---|---|
| 4,789,850 A | * | 12/1988 | Sepso | G01K 7/22 29/612 |
| 4,790,777 A | * | 12/1988 | Iimori | H01R 13/50 439/744 |
| 5,190,048 A | * | 3/1993 | Wilkinson | A61B 5/0878 600/537 |
| 5,413,111 A | * | 5/1995 | Wilkinson | A61B 5/411 600/519 |
| 6,431,750 B1 | * | 8/2002 | Haberbusch | G01F 23/22 374/142 |

(Continued)

FOREIGN PATENT DOCUMENTS

| | | | |
|---|---|---|---|
| CN | 202048997 U | * | 11/2011 |
| JP | 61114339 U | * | 7/1986 |

(Continued)

*Primary Examiner* — Clayton E LaBalle
*Assistant Examiner* — Leon W Rhodes, Jr.
(74) *Attorney, Agent, or Firm* — Lowenstein Sandler LLP

(57) ABSTRACT

A surface temperature sensor, including: an NTC or PTC thermistor; and a flexible printed circuit (FPC) or flexible flat cable (FFC) or conducting wire including at least two rows of single calendaring copper wires. The NTC or PTC thermistor and the FPC or FFC or conducting wire are welded together to form welding points. The thermistor and the welding points are packed inside a thin film by hot pressing. The thin film is a polyimide, a polyethylene terephthalate (PET) plastic, an aramid fiber, an aromatic polyamide, a polyether ether ketone, or a silicone rubber.

3 Claims, 2 Drawing Sheets

(56) References Cited

U.S. PATENT DOCUMENTS

| | | | |
|---|---|---|---|
| 6,919,529 B2 * | 7/2005 | Franzen | H01R 43/0221 219/121.64 |
| 8,338,808 B2 * | 12/2012 | Fraser | H01J 61/20 210/175 |
| 2012/0102727 A1 * | 5/2012 | Tien | H01R 43/055 29/761 |
| 2012/0235669 A1 * | 9/2012 | Lee | G01K 1/08 324/156 |

FOREIGN PATENT DOCUMENTS

| | | | |
|---|---|---|---|
| JP | 08128901 A | * | 5/1996 |
| JP | 2003005575 A | * | 1/2003 |
| JP | 2010038763 A | * | 2/2010 |
| JP | 2011007612 A | * | 1/2011 |
| JP | 2012068131 A | * | 4/2012 |

* cited by examiner

SURFACE TEMPERATURE SENSOR

CROSS-REFERENCE TO RELATED APPLICATIONS

This application is a continuation-in-part of International Patent Application No. PCT/CN2013/074367 with an international filing date of Apr. 18, 2013, designating the United States, now pending, and further claims priority benefits to Chinese Patent Application No. 201210148400.8 filed May 14, 2012, to Chinese Patent Application No. 201210235742.3 filed Jul. 9, 2012, and to Chinese Patent Application No. 201210340007.9 filed Sep. 14, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a surface temperature sensor, and more particularly to a temperature sensor comprising a flexible printed circuit (FPC) or flexible flat cable (FFC) or conducting wire comprising two or more rows of single calendaring wires prepared by thin film hot pressing technology.

Description of the Related Art

A thermal resistance temperature sensor includes a thin film type temperature sensor and a negative temperature coefficient (NTC) or positive temperature coefficient (PTC) temperature sensor. A typical thin film temperature sensor is formed by packing a bare die type thermistor within a thin film, and soldering a thermistor pin and a conducting wire together by a tin solder. Because the melting temperature of the tin solder is approximately 140° C., in case the temperature exceeds 140° C., the connection between the thermistor pin and the conducting wire tends to disconnect due to the melting of the tin solder, thereby resulting in the failure of temperature measurement. Besides, the thin film temperature sensor is short and needs to be connected to a connecting wire, and the connecting part must be insulated. Thus, the service environment and application range of the thin film temperature sensor are largely restricted.

The thermistor temperature sensor utilizes epoxy resin to pack the NTC or PTC thermistor inside a casing, and a terminal or a jack is formed at the rear part of the sensor. The manufacture process is complex, and problems easily occur including a poor contact or disconnection of the thermistor temperature sensor resulting from insufficient terminal tension, inadequate high voltage, and variance of resistance value of the thermistor due to poor glue seal and line control failures.

SUMMARY OF THE INVENTION

In view of the above-described problems such as small ranges of service temperature, narrow scope of application of the thin film type temperature sensor, and difficulties in manufacturing the NTC or PTC temperature sensor, it is one objective of the invention to provide a surface temperature sensor.

To achieve the above objective, in accordance with one embodiment of the invention, there is provided a surface temperature sensor, comprising: an NTC or PTC thermistor; and a flexible printed circuit (FPC) or flexible flat cable (FFC) or conducting wire comprising at least two rows of single calendaring copper wires. The NTC or PTC thermistor and the FPC or FFC or conducting wire are welded together to form welding points. The thermistor and the welding points are packed inside a thin film by hot pressing. The thin film is a polyimide, a polyethylene terephthalate (PET) plastic, an aramid fiber, an aromatic polyamide, a polyether ether ketone, or a silicone rubber.

In a class of this embodiment, a metal conducting wire is disposed inside the thin film. The metal conducting wire is a copper wire.

In a class of this embodiment, the thermistor, the welding points, and a front end part of the FPC or FFC or conducting wire connected to the welding points are packed inside the thin film by hot pressing. The calendaring copper wires of the FPC or FFC or conducting wire are arranged side by side from left to right in two rows or are stacked together in an upper layer and a lower layer.

In a class of this embodiment, the thermistor, the welding points, and the whole FPC or FFC or conducting wire are all packed inside the thin film by hot pressing, welding, or via an adhesive.

In a class of this embodiment, a rear part of the FPC or FFC or conducting wire is provided with a connector deck.

In a class of this embodiment, the rear part of the FPC or FFC or conducting wire is provided with a FFC pin.

In a class of this embodiment, the thermistor is a glass-sealed single-ended NTC thermistor or a glass-sealed diode type NTC thermistor.

In a class of this embodiment, the thermistor is a bare die type NTC or PTC thermistor.

In a class of this embodiment, the FPC or FFC comprising a plurality of the single calendaring copper wires is an FPC or FFC and is capable of forming the FPC or FFC comprising at least two rows of single calendaring copper wires after division.

In a class of this embodiment, the surface temperature sensor is installed on a bottom part, an upper part, an outer surface or an inner surface of a left or a right side of a temperature measuring vessel, or between sandwich layers thereof.

The present disclosure also provides a surface temperature sensor, comprising: an NTC thermistor and a flexible flat cable or conducting wire. The NTC thermistor and the flexible flat cable or conducting wire are welded together to form welding points. The NTC thermistor and the welding points are packed within a thin film by hot pressing.

The NTC or PTC thermistor and the FPC or FFC or conducting wire comprising at least two rows of single calendaring copper wires are welded together and are packed within a thin film by hot pressing. The connector deck or pin of the FPC or FFC is utilized to weld the FPC or FFC and a printed circuit board (PCB) together. Compared with the prior art, the invention combines the technology of FPC or FFC comprising two or more rows of signal calendaring copper wirings and the thermistor packing technology by the thin film to manufacture the NTC surface temperature sensor, so that problems, such as small ranges of service temperature, narrow scope of application of the thin film type temperature sensor, and difficulties in manufacturing the NTC or PTC temperature sensor, are solved. The NTC surface temperature sensor has a temperature resistant range of between −50° C. and 270° C., is resistant to 2.8 kilovolt high voltage. The waterproof effect is good, the reliability is high, and the production cost is largely decreased.

DETAILED DESCRIPTION OF THE EMBODIMENTS

For further illustrating the invention, experiments detailing a surface temperature sensor are described hereinbelow combined with the drawings.

The invention provides a surface temperature sensor. An NTC or PTC thermistor is connected to an FPC or FFC comprising two or more rows of signal calendaring copper wires, and the connected NTC thermistor and the FPC or FFC comprising the two or more rows of signal calendaring copper wires are sealed and covered by a thin film by hot pressing package. The NTC surface temperature sensor manufactured by such a method can be applied in different occasions and environment according to the length of FPC or FFC or conducting wire comprising the two or more rows of signal calendaring copper wires. Besides, the product has a simple manufacturing procedure, low production cost, and high reliability. The thin film has a temperature resistant range of between −50 and 270° C. and is resistant to a 2.8 kilovolt high voltage. A sealing part of the thin film has superb water proof property. Different thin film material and thickness of the invention produce more combinations of temperature resistance and pressure resistance.

It should be noted that when the surface temperature sensor is applied to different products, it can be installed in a bottom part, an upper part, and an inner surface or outer surface of a left or right side, or between sandwich layers of a vessel where temperature is to be tested.

The surface temperature sensor of the invention is further illustrated hereinbelow combined with drawings.

Example 1

Figure 1:
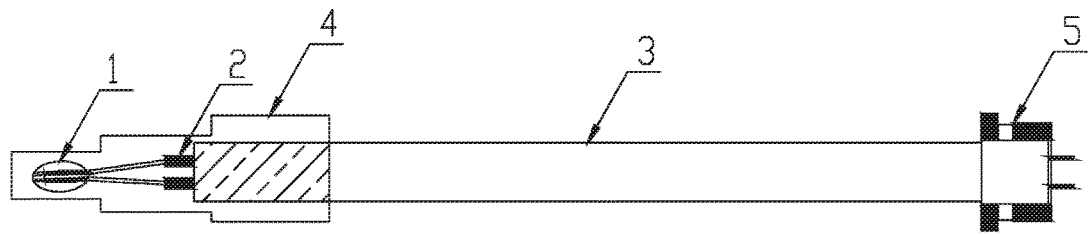
FIG. 1 is a structure diagram of a surface temperature sensor in accordance with Example 1.

As shown in FIG. 1, a surface temperature sensor comprises an NTC or PTC thermistor 1 and an FPC or FFC 3 comprising two rows of single calendaring copper wires. The thermistor 1 is a glass-sealed single-ended NTC thermistor. A thermistor pin and the FPC or FFC 3 comprising the two rows of signal calendaring copper wires are welded together to form welding points 2. The thermistor 1 and the welding points 2 are packed inside a thin film 4 by hot pressing.

The thin film 4 is a polyimide, a polyethylene terephthalate (PET) plastic, an aramid fiber, an aromatic polyamide, a polyether ether ketone, or a silicone rubber. The thin film 4 is divided into an upper layer and a lower layer. The thermistor 1, the welding points 2, and a front end part of the FPC or FFC 3 comprising the two rows of single calendaring copper wires are clamped by the thin film 4 and packed together by hot pressing.

It should be noted that the thin film 4 can be processed into a sleeve shape, so that it only needs to insert the thermistor 1, the welding points 2, and the front end part of the FPC or FFC 3 comprising the two rows of single calendaring copper wires into the sleeve shaped thin film and use the hot pressing package to pack them together. The two layers of the thin film are bonded by hot pressing or welding, or via an adhesive or other auxiliary materials.

A rear part of the FPC or FFC 3 comprising the two rows of single calendaring copper wire is provided with a connector deck 5. The FPC or FFC 3 comprising the two rows of single calendaring copper wire is connected to a PCB board by the connector deck 5.

Example 2

Figure 2:
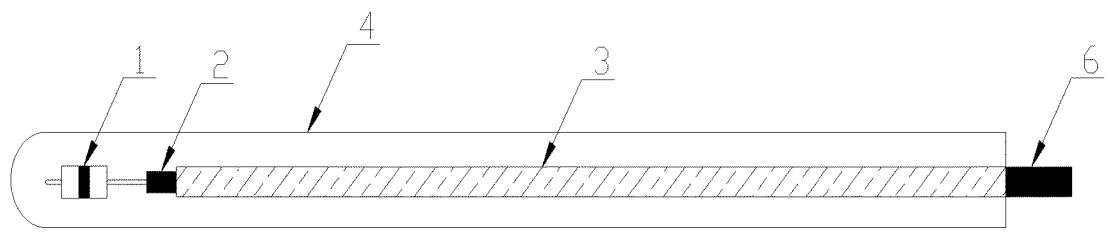
FIG. 2 is a structure diagram of a surface temperature sensor in accordance with Example 2.

As shown in FIG. 2, a surface temperature sensor comprises a thermistor 1 and a conducting wire 3. The conducting wire comprises an upper layer and a lower layer, the upper layer is stacked on the lower layer and is isolated from the lower layer by a thin film. The thermistor 1 is a glass-sealed diode type NTC thermistor. A thermistor pin and the conducting wire 3 are welded together to form welding points 2. The thermistor 1 and the welding points 2 are packed inside the thin film 4 by hot pressing.

The thin film 4 is a polyimide, a polyethylene terephthalate (PET) plastic, an aramid fiber, an aromatic polyamide, a polyether ether ketone, or a silicone rubber. The thin film 4 is divided into an upper layer and a lower layer. The thermistor 1, the welding points 2, and a front end part of conducting wire 3 are clamped by the thin film 4 and packed together by hot pressing. The two layers of the thin film are bonded by hot pressing or welding, or via an adhesive or other auxiliary materials.

A rear part 6 of the conducting wire 3 is a tin-coated pin which can be directly welded on a PCB board.

Example 3

Figure 3:
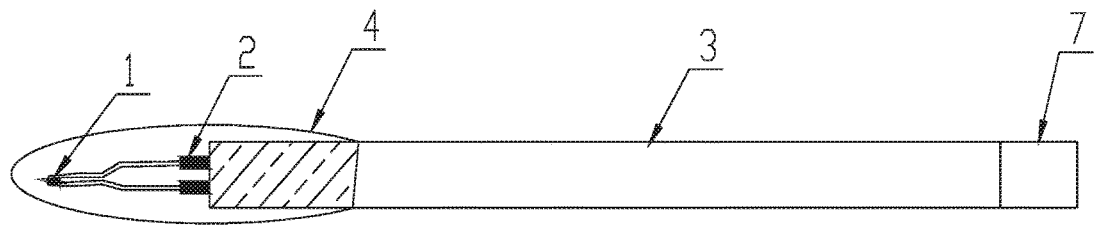
FIG. 3 is a structure diagram of a surface temperature sensor in accordance with Example 3.

As shown in FIG. 3, a surface temperature sensor comprises an NTC or PTC thermistor 1 and an FPC or FFC 3 comprising two rows of single calendaring copper wires. The thermistor 1 is a thin film type NTC or PTC thermistor. A thermistor pin and the FPC or FFC 3 comprising the two rows of signal calendaring copper wires are welded together to form welding points 2. The thermistor 1 and the welding points 2 are packed inside a thin film 4 by hot pressing.

The thin film 4 is a polyimide, a polyethylene terephthalate (PET) plastic, an aramid fiber, an aromatic polyamide, a polyether ether ketone, or a silicone rubber. The thin film 4 is divided into an upper layer and a lower layer. The thermistor 1, the welding points 2, and a front end part of the FPC or FFC 3 comprising the two rows of single calendaring copper wires are clamped by the thin film 4 and packed together by hot pressing.

It should be noted that the thin film 4 can be processed into a sleeve shape, so that it only needs to insert the thermistor 1, the welding points 2, and the front end part of the FPC or FFC 3 comprising the two rows of single calendaring copper wires into the sleeve shaped thin film and use the hot pressing package to pack them together. The two layers of the thin film are bonded by hot pressing or welding, or via an adhesive or other auxiliary materials.

A rear part of the FPC or FFC 3 comprising the two rows of single calendaring copper wires is provided with a FFC pin 7 so as to directly insert the FPC or FFC 3 comprising the two rows of single calendaring copper wires into a connector deck.

Example 4

Figure 4:
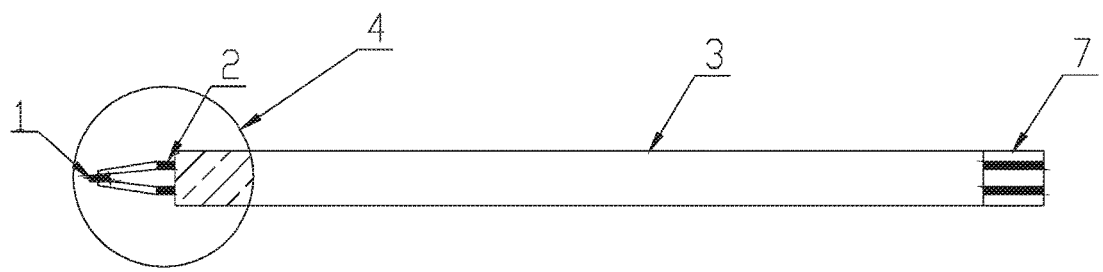
FIG. 4 is a structure diagram of a surface temperature sensor in accordance with Example 4.

As shown in FIG. 4, a surface temperature sensor comprises a thermistor 1 and an FPC or FFC 3 comprising two rows of single calendaring copper wires. The thermistor 1 is a bare die type NTC or PTC thermistor. A thermistor pin and the FPC or FFC 3 comprising the two rows of signal calendaring copper wires are welded together to form welding points 2. The thermistor 1 and the welding points 2, and the whole FPC or FFC 3 comprising the two rows of signal calendaring copper wires are packed inside a thin film 4 by hot pressing.

The thin film 4 is a polyimide, a polyethylene terephthalate (PET) plastic, an aramid fiber, an aromatic polyamide, a polyether ether ketone, or a silicone rubber. The thin film 4 is divided into an upper layer and a lower layer. The thermistor 1, the welding points 2, and the whole FPC or FFC 3 comprising the two rows of single calendaring copper wires are clamped by the thin film 4 and packed together by hot pressing.

It should be noted that the thin film 4 can be processed into a sleeve shape, so that it only needs to insert the thermistor 1, the welding points 2, and the front end part of the FPC or FFC 3 comprising the two rows of single calendaring copper wires into the sleeve shaped thin film and use the hot pressing package to pack them together. The two layers of the thin film are bonded by hot pressing or welding, or via an adhesive or other auxiliary materials.

A rear part of the FPC or FFC 3 comprising the two rows of single calendaring copper wires is provided with a conducting wire pin 7. The FPC or FFC 3 comprising the two rows of single calendaring copper wires and a PCB board are connected by welding via the conducting wire pin 7.

Example 5

Figure 5:
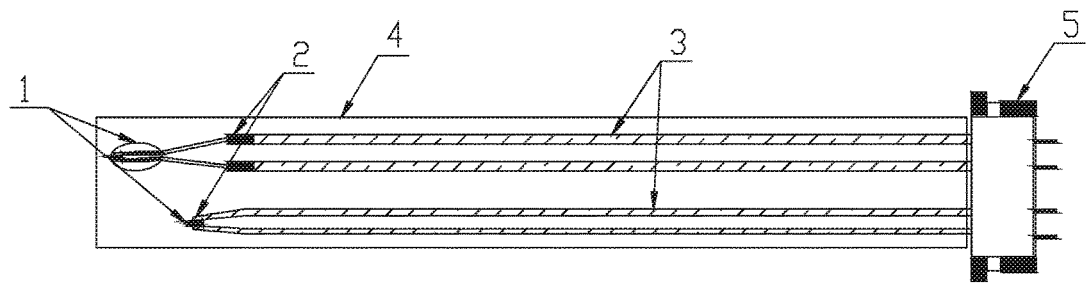
FIG. 5 is a structure diagram of a surface temperature sensor in accordance with Example 5.

As shown in FIG. 5, a surface temperature sensor comprises two thermistors 1 which are a combination of any two of a thin film type NTC or PTC thermistor, a bare die type NTC or PTC thermistor, a glass-sealed diode type NTC thermistor, and a glass-sealed single-ended NTC thermistor. Thermistor pins and conducting wires 3 are connected by welding so as to form welding points 2. The conducting wires 3 are arranged side by side from left to right in two rows or are stacked together in an upper layer and a lower layer. The thermistors 1, the welding points 2, and the whole conducting lines 3 are packed inside a thin film 4 by hot pressing.

The thin film 4 is a polyimide, a polyethylene terephthalate (PET) plastic, an aramid fiber, an aromatic polyamide, a polyether ether ketone, or a silicone rubber. The thin film 4 is divided into an upper layer and a lower layer. The two thermistors 1, the welding points 2, and the whole conducting wires 3 are clamped by the thin film 4 and packed together by hot pressing.

It should be noted that the thin film 4 can be processed into a sleeve shape, so that it only needs to insert the thermistor 1, the welding points 2, and the whole conducting wires 3 into the sleeve shaped thin film and use the hot pressing package to pack them together. The two layers of the thin film are bonded by hot pressing or welding, or via an adhesive or other auxiliary materials.

A connector deck 5 is disposed at rear parts of the conducting wires 3 so as to connect the conducting wires 3 to a PCB board by welding.

Example 6

Figure 6:
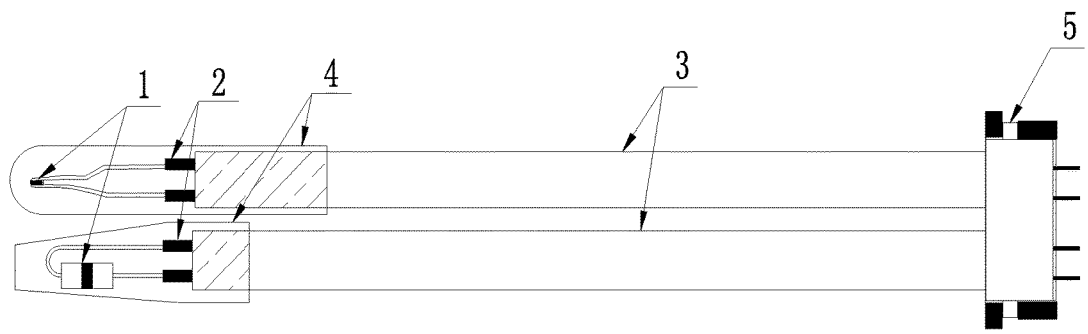
FIG. 6 is a structure diagram of a surface temperature sensor in accordance with Example 6.

As shown in FIG. 6, a surface temperature sensor comprises two thermistors 1 which are a combination of any two of a thin film type NTC or PTC thermistor, a bare die type NTC or PTC thermistor, a glass-sealed diode type NTC thermistor, and a glass-sealed single-ended NTC thermistor. Thermistor pins is connected to FPC or FFCs and conducting wires 3 comprising four rows of single calendaring copper wires by welding so as to form welding points 2. The two thermistors 1, the welding points 2, and the whole FPC or FFCs and conducting wires 3 comprising the four rows of single calendaring copper wires are packed inside a thin film 4 by hot pressing so that two independent NTC surface temperature sensors are formed.

The thin film 4 is a polyimide, a polyethylene terephthalate (PET) plastic, an aramid fiber, an aromatic polyamide, a polyether ether ketone, or a silicone rubber. The thin film 4 is divided into an upper layer and a lower layer. The two thermistors 1, the welding points 2, and the whole FPC or FFCs and conducting wires 3 comprising the four rows of single calendaring copper wires are clamped by the thin film 4 and packed together by hot pressing.

It should be noted that the thin film 4 can be processed into sleeve shapes, so that it only needs to insert the two thermistor 1, the welding points 2, and the whole FPC or FFCs and conducting wires 3 comprising the four rows of single calendaring copper wires into the sleeve shaped thin films 4, respectively, and use the hot pressing package to pack them together. The two layers of the thin film are bonded by hot pressing or welding, or via an adhesive or other auxiliary materials.

A connector deck 5 is disposed at rear parts of the two independent NTC surface temperature sensors so as to connect the independent NTC surface temperature sensors to a PCB board by welding via the FPC or FFCs and conducting wires 3 comprising the four rows of single calendaring copper wires.

Example 7

Figure 7:
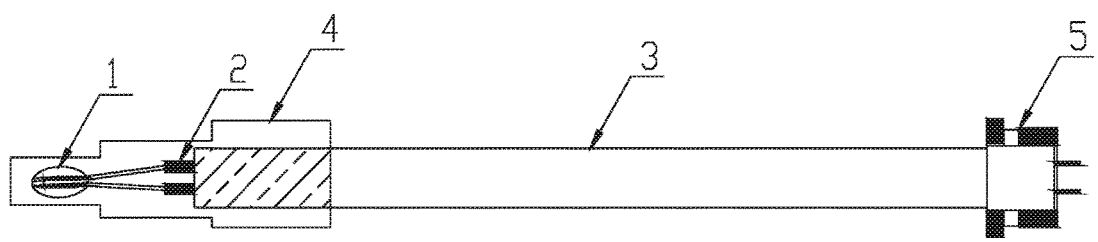
FIG. 7 is a structure diagram of a surface temperature sensor in accordance with Example 7.

As shown in FIG. 7, a surface temperature sensor comprises an NTC thermistor 1 and a flexible flat cable 3. The NTC thermistor 1 is a glass-sealed single-ended thermistor. A thermistor pin and the flexible flat cable 3 are welded together to form welding points 2. The NTC thermistor 1 and the welding points 2 are packed inside a thin film 4 by hot pressing.

The thin film 4 is a polyimide or other materials. The thin film 4 is divided into an upper layer and a lower layer. The thermistor 1, the welding points 2, and a front end part of the flexible flat cable 3 are clamped by the thin film 4 and packed together by hot pressing.

It should be noted that the thin film 4 can be processed into a sleeve shape, so that it only needs to insert the thermistor 1, the welding points 2, and the front end part of the flexible flat cable 3 into the sleeve shaped thin film and use the hot pressing package to pack them together.

A rear part of the flexible flat cable 3 is provided with a connector deck 5 so as to realize connection between the flexible flat cable 3 and a PCB board.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A surface temperature sensor, comprising:
   a) a negative temperature coefficient (NTC) or positive temperature coefficient (PTC) thermistor; and
   b) a flexible printed circuit (FPC) or flexible flat cable (FFC) comprising at least two rows of conducting copper wires formed by spraying, printing, chemical corrosion or calendering;
   c) two layers of thin films made of a polyimide, a polyethylene terephthalate (PET) plastic, an aramid fiber, an aromatic polyamide, or a polyether ether ketone;

wherein
   the NTC or PTC thermistor and a front end part of the FPC or FFC are welded together to form welding points;
   the whole thermistor, the welding points and the front end part of the FPC or FFC are packed inside the thin films by hot pressing; and
   the thin films are made of polyimide, a polyethylene terephthalate (PET) plastic, an aramid fiber, an aromatic polyamide, or a polyether ether ketone,
   the conducting copper wires of the FPC or FFC are arranged side by side from left to right in two rows or are stacked together in an upper layer and a lower layer.

2. The sensor of claim 1, wherein a rear part of the FPC or FFC is provided with a connector deck.

3. The sensor of claim 1, wherein a rear part of the FPC or FFC is provided with a FFC pin.

\* \* \* \* \*